UNITED STATES PATENT OFFICE 2,423,460

PHOTOGRAPHIC ELEMENTS CONTAINING POLYAMIDE DYE INTERMEDIATE LAYERS

David M. McQueen, Newark, Del., assignor to E. I. du Pont de Nemours & Company, Wilmington, Del., a corporation of Delaware No Drawing. Application March 31, 1944, Serial No. 528,944

6 Claims. (Cl. 95—7)

This invention relates to hydrophilic dye intermediate polymers. More particularly, it relates to novel hydrophilic polyamides containing a plurality of solubilizing groups and dye intermediate nuclei, and to photographic compositions, and elements and processes utilizing such polyamides.

An object of this invention is to provide new color-yielding compositions and elements containing or comprising hydrophilic polymers having dye intermediate nuclei. A further object is to provide hydrophilic dye intermediates which may be used as binding agents for silver halides. A still further object is to provide photographic color images in hydrophilic dye-forming polymer layers. Still other objects will be apparent from the following description of the invention.

The present invention involves the preparation and use of hydrophilic polyamide dye intermediates which are synthetic linear polyamides containing a plurality of solubilizing groups and a plurality of dye intermediate or color-forming nuclei. The polyamides contain a plurality of intralinear polyamide linkages and a plurality of ether, hydroxyl, or salt-forming groups as an integral part of the polymers and a plurality of dye intermediate or color-forming nuclei. The polyamides are hydrophilic because of the presence of such groups but their properties can be modified by the incorporation of solubilizing groups into the dye intermediate nuclei or by the incorporation of insolubilizing groups or radicals into the polymer molecule.

The solubilizing groups may be present as intralinear groups or atoms, e. g., intralinear ether (—O—) or amino (—NR—) groups or as lateral or side chain substitutes, e. g., hydroxyl groups, ether groups —OR, and amino groups

wherein R is a hydrocarbon radical, e. g., methyl, ethyl, etc., or a hydrocarbon radical containing salt-forming groups, e. g., —COOH, SO₃H, SO₄H, etc. These new polyamides form homogeneous unsupported films which are hydrophilic and permeable to aqueous photographic developer, fixing, bleaching, etc., solutions. The layers, moreover, are substantially colorless and transparent. The term "hydrophilic" as used in this application and claims, when referring to the dye intermediates, etc., is intended to denote compounds which in the form of thin layers, e. g., one to ten microns in thickness, are insoluble in water at 20° C. but are freely water permeable.

The compounds may be prepared by introducing dye intermediate or color-former nuclei into the polyamide molecule. This may be accomplished by condensing a dye intermediate with a suitable synthetic linear polyamide directly or by means of a bifunctional condensation agent, e. g., formaldehyde, formaldehyde-yielding compounds, etc.

By dye intermediate or color-former nuclei are meant nuclei containing groups which are capable of coupling with a diazo compound to form an azo dye. Such nuclei are usually also capable of coupling with the oxidation products of a color coupling aromatic primary amino developing agent formed on the development of silver salt images to form a quinoneimine (including indamine, indoaniline and indophenol) dye or an azomethine dye.

Nuclei of the above type are well known in the dye art and color photography art. They are sometimes called color-former components, dye-coupling components, etc.

These dye intermediate nuclei have as the active coupling groups a structure which may be represented as

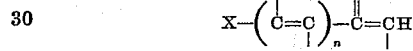

where X is HO— or RNH,- where R is hydrogen or a saturated aliphatic group, e. g., methyl, ethyl, beta-hydroxyethyl, beta-chloroethyl, benzyl, dodecyl, etc., and $n$ is 0 or 1. This group is found in the reactive methylene dye intermediates and in aromatic hydroxyl and amino compounds and includes the reactive ethenol, aminoethenyl, 4-hydroxy- and 4-amino-1,3-butadienyl groups. These groups occur in phenols, naphthols, anilines, naphthylamines, acylacetamides, cyanoacetamides, beta-ketoesters, pyrazolones, homophthalimides, coumaranones, indoxyls, thioindoxyls, etc.

The reactive ethenol group represented by

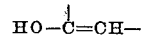

occurs in phenols and naphthols which couple in the ortho position and in the alkali soluble or enol form of most reactive methylene dye intermediates. These reactive methylene groups have a hydrogen rendered mobile by the proximity of certain unsaturated groups such as, for example,

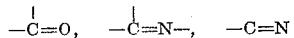

and others. The —CH₂ group is usually present between two such groups, for example

—COCH₂CO—

COCH₂CN, —COCH₂C=N— in a cyclic or acyclic system.

The reactive aminoethenyl group,

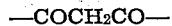

occurs in aromatic amino compounds which couple in the ortho position.

The 4-hydroxy- and 4-amino-1,3-butadienyl groups represented as

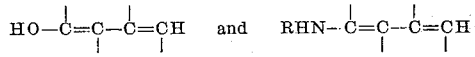

occur in phenolic, naphtholic and aromatic amino compounds which couple in the para (4) position.

In all of these dye intermediate groups the hydrogen atom in the coupling reactive position may be replaced by groups readily eliminated in the coupling reaction, e. g., halogen, sulfonic acid, carboxylic acid, etc.

The term "synthetic linear polyamide" as used in the present invention refers to the polymeric condensation products containing recurring amide linkages which can be derived from (1) monoamino monocarboxylic acids, (2) diamines with dibasic carboxylic acids, or (3) interpolymers of amino carboxylic acids with diamines and dibasic carboxylic acids. Amide-forming derivatives of these difunctional reactants may also be employed. General methods for preparing such condensation polymers are described in U. S. Patent 2,071,250. The polyamides suitable for this invention should contain at least one amide group to every 22 atoms of the polymer chain, and preferably at least 1 solubilizing group for every 40 atoms of the polymer chain. The polyamides, moreover, are highly polymeric and should have a unit length of at least 20 where "unit length" is defined as in U. S. Patents 2,071,253 and 2,130,948.

The preferred polyamides for use in preparing the hydrophilic dye intermediates of this invention have an intrinsic viscosity of above 0.4 where intrinsic viscosity is defined as $$\frac{\log_e Nr}{C}$$

wherein $Nr$ is the viscosity of a dilute metacresol solution divided by the viscosity of metacresol in the same units and at the same temperature, and $C$ is the concentration in grams of polyamide per 100 units of solution. They have a high softening point when dry. The preferred hydrophilic color-forming polyamides are soluble to the extent of at least 5 parts in 100 parts of boiling water or a boiling mixture of water containing less than 50% of a water miscible solvent and preferably less than 25% of ethanol.

To secure this degree of solubility, it is necessary to choose the polyamides used for preparing the hydrophilic film-forming polyamides from among those products which possess the requisite solubility in aqueous solutions or to introduce solubilizing groups into products of insufficient solubility. Polyamides of the requisite solubility which contain a plurality of intralinear hetero atoms such as oxygen and amino nitrogen atoms are described in U. S. Patents 2,158,064 and 2,191,556. Other useful polyamides of the proper solubility containing several solubilizing components are described in U. S. Patents 2,285,009 and 2,320,088. A fairly wide range in the degree of solubility in aqueous solvents is provided by the use of the products of such patents as intermediate materials.

Still other useful hydrophilic polyamides which contain hydroxyl groups, carboxymethoxy (—OCH₂COOH)

methoxy, ethoxy, methoxyethoxy, etc., and salt-forming groups such as those described in U. S. applications Serial Nos. 445,635 filed June 3, 1942 (refiled as application Serial Number 539,195 on June 7, 1944) and 445,651 filed June 3, 1942, can be used. Such polyamides can be prepared after the manners described in such applications. These methods comprise reacting a less water soluble polyamide with formaldehyde or with formaldehyde in the presence of an alcohol, e. g., ethyl, methoxyethyl, methyl, benzyl, and esters of glycolic acid, e. g., methyl glycolate, ethyl glycolate, etc. Alkaline hydrolysis of these last mentioned hydroxy ester-containing polyamides yields a desirable class of soluble polyamide-containing carboxymethoxy groups.

The introduction of dye intermediate or color-former nuclei into the polyamides will be further described in the following exemplary procedure. A polyamide soluble in water or water-alcohol mixtures, e. g., the condensation polymer obtained from (1) tri-glycoldiamine and sebacic acid, (2) bis-aminopropoxyethane and adipic acid, (3) hexamethylenediamine and diglycolic acid, (4) diaminodipropyl ether and adipic acid, (5) hexamethylenediamine and adipic acid further reacted with formaldehyde and methanol to contain methoxymethyl groups on about 10 to 20% of the amide groups, (6) hexamethylenediamine and N-methyliminodiacetic acid, (7) hexamethylenediamine and N,N'-piperazine diacetic acid, (8) hexamethylenethiamine and adipic acid further reacted with formaldehyde and methyl glycolate to contain methoxycarboxymethoxymethyl groups on about 10 to 20% of the amide groups, is condensed in acidic medium, e. g., formic acid, with formaldehyde or formaldehyde generating compounds, e. g., paraformaldehyde, to form the methylol polyamide which is further condensed with a dye intermediate reactive with formaldehyde, e. g., a phenolic, naphtholic, or aromatic amino compound, including those containing a hydroxyl or amide group on a side chain, or an active methylene coupling component such as phenylmethylpyrazolone, acetoacetanilide, thioindoxyl, N-homophthalylamines, etc. Alternatively, the formaldehyde-reacting material may first be condensed with the dye intermediate to form the methylol derivative, e. g., o-methylolphenol, methylol phenylmethylpyrazolone, etc., which may itself be condensed with the polyamide in acidic solution.

The dye intermediate substituted hydrophilic polyamides prepared in the above way contain dye intermediate substituted amide groups as a part of the polymer chain. These substituted amide groups have the structure

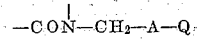

wherein A may be a single bond or an amino, amide, sulfonamide, sulfide or ether oxygen, etc., group and Q is a dye intermediate nucleus as described previously.

Light-sensitive compositions can advantageously be made by dissolving the novel hydrophilic polyamide dye intermediate in an aqueous solvent and incorporating light-sensitive silver salts therewith. Suitable solvents include water containing 50% or less of a water miscible solvent, e. g., ethanol, methanol, acetone, etc. A water soluble inorganic halide, e. g., sodium bromide can then be incorporated in a solution of the dye intermediate and a solution of a water soluble silver salt, e. g., silver nitrate, added. Silver halides are precipitated in the hydrophilic dye intermediate whereby a light-sensitive colloid composition is formed. The resulting composition can be further treated to improve the light-sensitive properties of the composition, e. g., it can be ripened, coagulated, freed from excess soluble salts, digested, the pH and concentration adjusted, and then coated onto a suitable support. Various types of sensitizing dyes which modify the spectral sensitivity of the resulting emulsion can be added, if desired. Similarly, emulsion sensitizers, anti-fogging agents, preservatives, hardeners and/or other emulsion constituents can be added at various stages prior to coating. The final solution can be coated on to a support, e. g., paper, metal, glass, a transparent cellulose derivative film or a synthetic resin film such as polyvinyl acetal, or a superpolyamide such as nylon, or onto a colloid layer on such a support, e. g., a gelatin layer or a similar hydrophilic dye intermediate layer in the same manner that a gelatino silver halide emulsion is coated. After drying, the resulting element can be exposed and processed to colored images in the same manner as a film containing gelatino silver halide-color former layers can be processed.

The hydrophilic polyamide dye intermediates above described possess a number of useful properties among which may be mentioned (1) ability to form a strong, coherent, unsupported film, (2) ready permeability to water and photographic processing solutions at temperatures in the neighborhood of 20° C., (3) insolubility and freedom from softening in water at moderate temperatures, (4) transparency and freedom from color, (5) adequate solubility in satisfactory solvents for coating, (6) freedom from adverse action on sensitive silver salts, (7) a relatively high softening point, and (8) ability to disperse, prevent coagulation and sedimentation of silver salts.

The following examples in which parts are by weight, all temperatures centigrade, and all solutions aqueous unless otherwise stated, are illustrative of the nature of the invention and not intended to limit it in any way. It is to be understood, of course, that in the preparation of the light-sensitive silver halide dispersions all light is excluded which will expose or cause fogging of the silver halide grains.

*Example I*

A mixture of 20 parts of diaminodipropyl ether/adipic acid polyamide prepared by heating an equimolar mixture of diaminodipropyl ether and adipic acid at 220° for two hours and 50 parts of formic acid is stirred at 65° until a solution is obtained; then ten parts of saligenin is added and stirring at 65° continued for one-half hour. Five hundred parts of acetone is added to precipitate the hydrophilic dye intermediate. The solid is removed by filtration, extracted with acetone, and dried to give 26 parts of a white powder containing approximately one o-hydroxy-benzyl group for each six amide groups. To 4 parts of this polymer and 5 parts of 1% sodium dodecyl sulfate dissolved in 100 parts of 30% ethanol-water is added 25 parts by volume of 3 N ammonuim bromide and 5 parts by volume of concentrated ammonium hydroxide. The solution is stirred at 45° while adding 20 parts by volume of 3 N silver nitrate. The resulting light-sensitive silver bromide dispersion is coagulated by addition of 100 parts of acetone, washed in running water for one-half hour, drained, and mixed with 4 parts of the polymer dissolved in 100 parts of 25% ethanol.

After stirring at 60° for one-half hour, the solution is coated on cellulose acetate film base, dried, exposed, and developed in the following composition:

| | Parts |
|---|---|
| p-Aminodiethyl aniline hydrochloride | 2 |
| Sodium sulfite | 3 |
| Sodium carbonate | 20 |
| Water to make | 1000 | made by dissolving the constituents in 500 parts of water and diluting the solution to 1000 parts in running water, bleached in 4% potassium ferricyanide, and fixed. The resulting film contains a strong blue-green negative image.

*Example II*

A mixture of 50 parts of bis-aminopropoxyethane/adipic acid polyamide prepared by heating together at 200° an equimolar mixture of bis-aminopropoxyethane and adipic acid in 100 parts of formic acid is stirred at 65° until a solution is obtained. Then 25 parts of paraformaldehyde is added and stirring at 65° continued for fifteen minutes, followed by addition of 90 parts of phenylmethylpyrazolone and stirring for thirty minutes, after which 20 parts of butanol is added and stirred for fifteen minutes. The solution is precipitated by adding 1000 parts of acetone. The solid is removed by filtration, extracted with acetone, and dried to give 50 parts of a white powder. This material is the mixed butyloxymethyl-phenylmethylpyrazolonoxymethyl polyamide having approximately one color-forming group for each eight amide groups and is used in place of the binding agent employed in Example I and the resulting light-sensitive compound is coated on a cellulose nitrate film base, exposed and processed as in Example I to yield a bright magenta negative dye image.

*Example III*

To a solution at 60° of 20 parts of the triglycoldiamine/adipic acid polyamide in 50 parts of 90% formic acid is added 6 parts of paraformaldehyde and the mixture stirred at 60° for fifteen minutes; then 53 parts of aceto-acetanilide is added and stirring at 60° continued for one-half hour. The product is precipitated by addition of 500 parts of acetone, the solid removed by filtration and extracted with acetone and dried to yield 28 parts of a yellowish white powder, having color-forming units of the following probable structure:

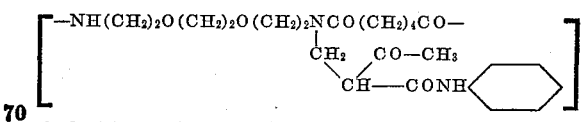

A light-sensitive composition similar to Example I is prepared using this material, coated on cellulose acetate film base, exposed and processed as in Example I to yield a bright yellow dye image.

Example IV

Thirty parts of a fast gelatin-silver iodobromide emulsion is melted at 40° C. and diluted with 300 parts of distilled water. This diluted emulsion is spun in a centrifuge until the silver halide has separated from the aqueous gelatin solution. After washing with warm water, 10 parts of this moist silver halide is dispersed in a solution of 10 parts of a polyamide binding agent prepared as in Example I using 15 parts of 2-hydroxy-3-phenylbenzyl alcohol in place of the saligenin, dissolved in 200 parts of 20% ethanol-water. The resulting fast, light-sensitive dispersion of silver halide in the hydrophilic polyamide having on about 10% of the amide groups 2-hydroxy-3-phenylbenzyl groups is coated on a cellulose nitrate base, exposed to an object, and processed as in Example I to yield a blue-green dye image.

Example V

The light-sensitive coated films of the above examples are exposed and developed in the non-color-coupling photographic developer of the following composition:

| | Parts |
|---|---|
| Water | 975 |
| p-N-methylaminophenol sulfate | 2.5 |
| Sodium sulfite (anhydrous) | 75.0 |
| Hydroquinone | 3.0 |
| Sodium carbonate (anhydrous) | 30.0 |
| Potassium bromide | 2.0 | washed, re-exposed or chemically fogged, then treated as the film in Example I, whereupon a positive color image of the same color is obtained.

Example VI

A monopack suitable for natural color reproduction is prepared by coating on a cellulose acetate film base the following compositions: The light-sensitive material of Example I which has been sensitized to the red region of the spectrum but not the green by a green-blind red sensitizer, e. g., N,N'-diethyl naphthiocarbocyanineiodide. Over this is coated the light-sensitive composition of Example II which has been sensitized to the green region with a sensitizing dye, e. g., erythrosin. Over this last mentioned layer is coated a layer of diaminodipropyl ether/adipic acid polyamide containing a removable yellow filter dye to absorb blue light, e. g., tartrazine CI-640. Above this yellow filter layer is coated the blue-sensitive composition of Example III. This film element is exposed to a colored object scene whereby latent images representing different color component aspects in the different layers are formed as is known in the art. The film is then processed by the following steps:

1. Develop ten minutes in the non-color-forming developer of Example V.
2. Wash ten minutes.
3. Re-expose to white light and reduce the residual silver salt by treatment for 15 minutes in the dye generating developer of Example I.
4. Wash 10 minutes.
5. Bleach 7 minutes in a solution containing 3.5% potassium ferricyanide and made alkaline with ammonium hydroxide.
6. Rinse.
7. Remove bleached silver in a 25% solution of hypo (crystalline sodium thiosulfate).
8. Wash 15 minutes and dry.

The colored photograph resulting from the above process is of exceptional clarity and brilliance. The definition is considerably greater than that obtained by use of previously known films.

Example VII

A cellulose nitrate base is coated with the light-sensitive coating of Example IV which has been sensitized to red light but not green by means of a green-blind sensitizing dye, e. g., pinacyanol. After drying, a solution of bis-aminopropoxyethane/adipic acid polyamide is coated on top of the emulsion, then dried, and the light-sensitive composition of Example II which has been orthochromatized is coated and dried. Next is coated a layer of bis-aminopropoxyethane/adipic acid polyamide containing a yellow (minus blue) filtering material, e. g., titanium ferrocyanide or N-octadecyl-alpha-(4-piperonylbutadienyl)-pyridinium bromide. (U. S. P. 2,255,077.) Over this is coated the light-sensitive composition of Example III. The resulting film is exposed to a colored object and treated by the development method of Example I to form a color negative in which all of the colors of the object scene are reproduced in their complementary color. This color negative is then printed onto an unexposed film of the same material using successive exposures of blue, green, and red light which are substantially complementary to the color of the dyes generated in the layers and, after processing by the method of Example I, a color positive is obtained.

Example VIII

A heavy white paper having a baryta coating is coated as is the film of Example VI. This multilayer element is exposed under the color positive of Example VI as in that example and processed in the same way to a color positive. A piece of this same paper is used in place of the film of Example VII as a printing stock and yields a multilayer color positive having clear bright colors of good definition and freedom from stain.

Example IX

A film prepared according to Example I is exposed and developed in the developer of Example I. After development, the film is washed and placed in a diazo solution prepared as follows: 1.73 parts of 2-chloro-4-nitro-aniline dissolved in 5 parts of concentrated sulfuric acid is mixed with 0.7 part of sodium nitrite dissolved in 5 parts of concentrated sulfuric acid and, after thoroughly mixing, the solution is poured with rapid stirring into a mixture of 600 parts of water and 400 parts of ice. Following this, 15 parts of sodium acetate and 7 parts of calcium hydroxide are added and the solution filtered at 0-5°. After two minutes in this solution, the film is placed in 1 molar hydrochloric acid at 5° for five minutes to wash out the excess of diazonium compound. The silver and developer coupling products are bleached by immersion for ten minutes at 15° in an aqueous solution containing 10% copper sulfate, 5% potassium bromide, and 5% concentrated hydrochloric acid. After washing, the film is fixed in a standard potassium alum-thiosulfate bath, washed, and dried to give a film containing a positive image in a brilliant yellow azo dye.

Example X

A film prepared according to Example II is exposed to an object, developed in the developer of Example V, washed, and dried. After re-exposure to white light, the film is developed in a solution containing 96 parts of water, 5 parts of 2% sodium oleate, 2 parts of phenylhydrazine, and 2 parts of sodium carbonate. The developed film, after washing, is bleached in 4% potassium ferricyanide and fixed. The film then contains a brilliant yellow positive azo dye image.

*Example XI*

A solution of 100 parts of polyhexamethylene adipamide (intrinsic viscosity 1.0) in 400 parts of 90% formic acid is stirred at 60°. To this is added 30 parts of paraformaldehyde and the mixture stirred at 60° for ten minutes, then 60 parts of 1-N-hydroxyethylaminonaphthalene-6-sulfonic acid and 25 parts of methylhydroxyacetate are added and the mixture stirred for one-half hour at 60°, then poured with stirring into 2000 parts of acetone and 1000 parts of water. The liquid is decanted and 1000 parts of 50% acetone water added and made alkaline by addition of ammonium hydroxide. After washing with 4 charges of 1000 parts each of 40% acetone, the product is dried and used in preparing a light-sensitive coating by the method of Example I. This material when processed by the methods of Examples IX and X yields brilliant magenta azo dye images.

*Example XII*

A solution of 30 parts of hexamethylene adipamide (intrinsic viscosity 1.0) in 400 parts of 90% formic acid is heated to 50° with stirring. To this solution is added 10 parts of paraformaldehyde and the mixture is stirred at 55° for 15 minutes, and then 20 parts of methyl glycolate and 30 parts of 4-chloro-1-naphthol are added and the mixture is stirred for one-half hour at 60°. At the end of this time the reaction mixture is poured with stirring into 800 parts of acetone. The liquid is decanted and the precipitate is washed with three changes of 500 parts each of acetone, the total wash time being 6 hours. The product is then filtered and dried to give a light-colored powdery polyamide containing 4-chloro-1-hydroxy-2-naphthyl groups and carbomethoxymethoxy groups attached through methylene groups to the amide nitrogens of the polyamide chain.

Ten parts of this color-forming polyamide is dissolved in 40 parts of 60% ethanol/water at 60° and 10% of sodium hydroxide is added until the solution after stirring for 5 minutes has a pH of 9. Under these conditions, the glycolic ester groups are hydrolyzed and the polymer contains carboxymethoxymethyl sodium salt groups

(NaOCOCH₂OCH₂—)

The reaction mixture may be diluted with water without precipitation of the hydrolysis product. After dilution of the solution with 55 parts of water, this diluted solution is used in preparing a light-sensitive coating by the method of Example I. The resulting film after exposure and processing according to Example I contains a strong blue-green negative dye image.

In place of any of the hydrophilic polyamide dye intermediates employed in the above examples, there may be employed other color-coupling polyamides, providing they have the previously described physical properties. In general, it has been found that ether oxygen atoms in the chain and on a side group are highly desirable in securing the proper degree of solubility and permeability. Hence, the preferred class of polymers employed in this invention desirably contain at least one ether oxygen atom for every 40 chain atoms or between 1 and 10 ether oxygen atoms for each 10 amide groups. The following compounds containing ether groups are among those valuable in preparing the polyamides used in producing the color-forming binding agents of the present invention:

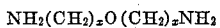
NH₂(CH₂)ₓO(CH₂)ₓNH₂

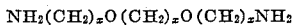
NH₂(CH₂)ₓO(CH₂)ₓO(CH₂)ₓNH₂

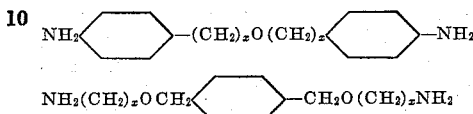

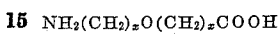
NH₂(CH₂)ₓO(CH₂)ₓCOOH

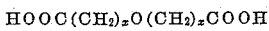
HOOC(CH₂)ₓO(CH₂)ₓCOOH

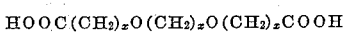
HOOC(CH₂)ₓO(CH₂)ₓO(CH₂)ₓCOOH

In these compounds $x$ is 1, 2, 3, or 4 and one or more of the hydrogen atoms on carbon atoms may be replaced by methyl, ethyl, etc. In addition, aliphatic diamines, dibasic acids, or amino-acids having small alkoxy groups, e. g., methoxy, ethoxy, propoxy, are useful in preparing these water sensitive polyamides.

Another useful class of intermediates for preparing water sensitive polyamides are those containing intralinear tertiary nitrogen groups such as the following:

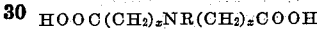
HOOC(CH₂)ₓNR(CH₂)ₓCOOH

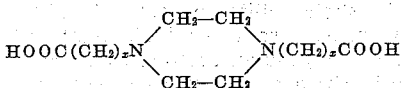

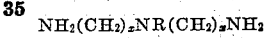
NH₂(CH₂)ₓNR(CH₂)ₓNH₂

In these compounds R is a small alkyl group, e. g., methyl ethyl propyl and $x$ is 2, 3, or 4.

In cases where the polyamide chain contains no water solubilizing group (ether or tertiary-amino group) or an insufficient number to cause a satisfactory solubility and permeability, the introduction of such groups by reaction with formaldehyde and active hydrogen compounds such as alcohols, amides, ureas, etc., is possible (see U. S. patent application Serial No. 445,635, filed June 3, 1942). Suitable alcohols include methyl, ethyl, propyl, beta-methoxy-ureas, ethyl, etc.

A high water solubility of the original polymer does not prevent its use in the preparation of the color-formers of the present invention, since the introduction of dye intermediate nuclei may decrease the cold water solubility to a point where the coated films are no longer softened excessively in water. If the binding agent does not have sufficiently high water sensitivity or solubility, this can be improved by the introduction of solubilizing groups. For example, the carboxylic or sulfonic acid group can be introduced by reaction with formaldehyde and an ester of a hydroxy acid, followed by hydrolysis, or by the use of a dye intermediate nucleus containing such solubilizing groups. Any of these solubilizing groups can be introduced either before or after introduction of the color-forming groups into the polymer.

Although the preferred method for forming these color-forming polyamide binding agents includes the use of formaldehyde or methylol dye intermediates, other procedures also yield useful products. Thus, dye intermediate nuclei containing aldehyde or acidic groups or derivatives thereof can be condensed with these same polyamides to form color-forming polyamide colloid binding agents of this invention. Also, compounds containing active halogen atoms, e. g., chloroacetic acid, can be condensed with amino dye intermediates to form the chloroacetamides which may then be condensed with polyamides containing intralinear tertiary nitrogen atoms to form quaternary salts.

In the method of preparing these polyamide color-forming binding agents employing formaldehyde to connect the color formers to the polyamide, the formaldehyde may be in any form. Thus, it can be used as solid paraformaldehyde, or dissolved or suspended in water or solvents for the polyamide, or as formaldehyde releasing compounds such as trioxane, hexamethylenetetramine, etc.

In addition to the color-forming groups of the above examples, many of the other well known coupling component groups may be employed. Thus, the dye intermediate nucleus may be any aromatic, phenolic, or amino compound having a coupling position available ortho or para to the activating group, or any active methylene compound, i. e., a compound having a —CH₂— group activated by two unsaturated groups taken from the class of

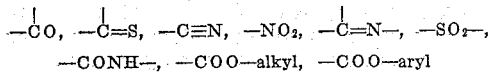

connected either directly or through a conjugated system. Such active methylene compounds are distinguished by their ability to enolize in alkaline solution forming a soluble alkali metal salt and include many acyclic and heterocyclic compounds known in the art. Examples of such active acyclic and intracyclic methylene compounds include (1) beta-ketoacyl amides of the type RCOCH₂CONHR, where R is a hydrocarbon or heterocyclic radical and R is preferably aromatic, e. g., benzoylacetanilide, p-nitrobenzoylacetanilide, p-nitroacetanilide, naphthoylacetanilide, p-acetoacetaminobenzoic acid, furoylacetanilide, (2) pyrazolones, e. g., 1-phenyl-3-methyl-5-pyrazolone, 1-p-chlorophenyl-3-methyl-5-pyrazolone, 1-5-phenyl-3-carboxy-5-pyrazolone, 1-m-sulfophenyl-3-methyl-5-pyrazolone, (3) indoxyl and thioindoxyl, (4) N-homophthalylamines, e. g., N-homophthalylaniline, N-homophthalyl-n-dodecylamine, N-homophthalyl-beta-naphthylamine, (5) 2,4-dihydroxyquinoline, (6) p-nitrobenzylcyanide, (7) diketohydrindene, (8) malonamides, e. g., ethyl-N-phenylmalonamate N-N'-diphenylmalonamide, (9) phenacylpyridium bromide, (10) hydroxypyridine, (11) cyanoacetanilide, cyanoacetic ethyl ester.

The color yielding elements of this invention are not limited in their utility to any one process of color photography. They may be used with other color coupling developing agents than those specifically described in the examples. The diamino aryl compounds such as para-phenylenediamine and its substitution products are preferred. These developers may be substituted in one amino group as well as in the ring, preferably the former, to constitute compounds such as the mono- and di-alkyl arylenediamines, including the mono- and di-alkyl naphthylenediamines, alkyl phenylenediamines and alkyl toluylenediamines. The compounds, of course, must have one free primary or unsubstituted amino group which enables the oxidation product of the developer to couple with the color-forming compounds. As examples of developers of the class described, there may be mentioned p-amino-diethylaniline, 1,4-naphthylenediamine, 4-diethyl-amino-1-naphthylamine. The salts of the bases which may be organic or inorganic are, in general, more soluble and more stable than the free bases. The hydrochlorides and sulfates have great utility in preparing the developing solutions.

Multilayer films other than those described in the above examples may be prepared using the novel ethers of this invention. In a modified three-color photographic element the layer for recording red light and producnig the blue-green part image may be sensitized to green and red light both and protected by a green-absorbing red filter layer between it and the exposure, or the sensitive layers may be coated in a different order, or one of these layers may be on the other side of the support. In addition, the color-coupling light-sensitive compositions hereof can be applied to a two-color process by suitable selection of dye intermediate nuclei and sensitizing compounds. Further, the invention can be combined with other processes for producing colored photographic images.

The hydrophilic polyamide dye intermediates hereof are also useful as adjacent layers in operative contact with non-color-forming layers containing silver salts. Thus, it has been found that a layer containing silver salts dispersed in a non-color-coupling binding agent, e. g., gelatin, etc., containing a latent or a silver salt image and having an adjacent coating of one of the color-forming polymeric ethers of the present invention may be processed as in Examples VI, VII, VIII, IX, X, above or by the other methods of color photography herein described to form colored images. Similarly, a multilayer film may be prepared and processed as in Example VI, using in place of each light-sensitive coating of that example a correspondingly color sensitized layer of gelatin-silver halide emulsion and a layer of the color-forming polymer containing no silver salt. Although it has been proposed to do this with gelatin layers containing dispersed insoluble color formers, the new film-forming color-formers of the present invention have advantages as previously discussed in color-forming strength, clarity, compatibility, film strength and stability, which make them greatly superior for such uses.

The new hydrophilic polyamide color formers are also useful in other colloid silver halide emulsion layers. Thus, they may be dissolved in water or aqueous solutions of water-miscible solvents and incorporated in gelatin-silver halide emulsions. The new color-formers being themselves binding agents and highly polymeric, do not, under these conditions, wash out of or migrate in the gelatin, etc., emulsions.

The products of this invention have a wide utility in color photography. Not only may they be utilized as a direct taking stock in the color development process as described in the above examples, but they are useful in duplicating or copying and making color prints on paper. Thus, the multilayer film of Example VI may be processed as in Example I to a color negative, then printed onto a similar film with white light or by exposure with blue, green, and red light controlled by suitable filters adjusted to the spectral qualities of the dyes and color sensitizers, and the printed material again processed as in Example I to a color positive. Thus, any number of color positives may be produced from a single color negative. Similarly, by using the procedure of Example VI on both the taking and printing stocks, color positives can be produced by reversal. In this way also, any number of color prints can be produced. The color negatives or positives produced according to this invention can also be employed in securing separation negatives or positives by known processes of color separation. The multilayer films such as described in Examples VI and VII can also be used as printing media by printing with suitable colored light from separation negatives or positives and proper processing as described above to yield color positives.

The new film elements prepared according to this invention have broad utility in azo dye processing, providing the proper azo dye coupling nuclei are attached to the polymer chain. In U. S. P. 2,297,732 and application Ser. No. 450,403, filed July 10, 1942, now U. S. Patent 2,342,620, is described a method for producing azo dye images involving color development and azo dye coupling steps. When the dye coupling nuclei of that invention are attached to the hydrophilic polyamides to prepare products of the present invention, the film elements prepared from them may be processed to pictures containing azo dye images of exceptionally good quality, stability, and clarity by the method described in the above mentioned patent. They are also useful in other azo processes. Thus, they may be employed with the hydrazine developers of U. S. Patent 2,220,929 and in the process of U. S. Patent 2,339,213, whereby azo dyes are produced on color development with aromatic hydrazine reducing agents. In addition, these elements are useful in the known processes involving conversion of silver salt images to silver antidiazotate images followed by coupling to form azo dye images.

A film element of this latter type is also useful in the catalytic bleach process employing silver or silver salt images. Thus, the film after exposure and processing employing non-coupling developers to a film containing silver or silver salt images may be treated with a suitable diazonium compound to uniformly dye the layers in their appropriate colors. By the use of the known catalytic bleach methods, this film may then be processed to a color negative or positive as desired.

An important advantage of the new film elements of this invention resides in the increased stability of the dye images formed. Another important advantage resides in the toughness of the light-sensitive layers. They are far superior to gelatin in this respect. Thus, a gelatin coated film when bent sharply between the thumb and forefinger with the gelatin side out, breaks in two. The elements hereof, on the other hand, can be folded repeatedly without breaking or cracking of the layer.

A further advantage resides in the fact that the color yielding layers produce the maximum color density obtainable from the amount of silver salt reduced by the color-coupling developer. This admits of the saving of silver halides. The lower amount of silver halides is of major importance in multilayer films because the innermost layers receive light passing through layers intervening the source of light. The less silver halide the upper layers contain, the less scattering of light there is and the more light passes through to the lower layers. This results in films having a higher overall sensitivity and a higher degree of definition and resolution than is obtainable by the use of immobile color formers in gelatin layers.

Another important advantage lies in the fact that thinner coatings can be used. The layers are tougher than gelatin and have a higher concentration of silver salts than gelatin. Moreover, they are uniform and their sensitivity can be accurately controlled by adding carefully measured amounts of sensitizing agents. The light-sensitive color-yielding coating compositions hereof are more stable than gelatin emulsions, are resistant to bacterial putrefaction and can be stored longer. As many apparently widely different embodiments of this invention may be made without departing from the spirit and scope thereof, it is to be understood that the invention is not limited to the specific embodiments thereof except as defined in the appended claims.

What is claimed is:

1. A color-yielding element comprising a support bearing at least one layer composed of a hydrophilic polyamide dye intermediate having a plurality of dye intermediate nuclei attached to recurring nitrogen atoms in the polyamide chain of atoms, said nuclei possessing a structure of the formula:

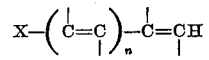

where X is a member of the group consisting of HO—, primary and secondary radicals and $n$ is a number from the group consisting of 0 and 1, having a light-sensitive silver halide dispersed therethrough.

2. A color-yielding element comprising a support bearing at least one layer composed of a hydrophilic polyamide dye intermediate having a plurality of dye intermediate nuclei linked through an ether oxygen atom to a —CH$_2$— group which is attached to recurring nitrogen atoms in the polyamide chain of atoms, said nuclei possessing a structure of the formula:

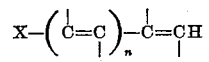

where X is a member of the group consisting of HO—, primary and secondary amino radicals and $n$ is a number from the group consisting of 0 and 1, said polyamide being soluble to the extent of at least 5% by weight in a boiling aqueous solution containing less than 50% of ethanol, said layer having light-sensitive silver halides dispersed therethrough.

3. A color-yielding element comprising a support bearing at least one layer composed of a hydrophilic polyamide dye intermediate, said polyamide having a plurality of extralinear dye intermediate groups possessing a structure of the formula:

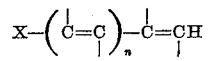

where X is a member of the group consisting of HO—, primary and secondary amino radicals and $n$ is a number from the group consisting of 0 and 1, said dye intermediate groups being linked through an ether oxygen atom to a —CH$_2$— group which is attached to recurring nitrogen atoms in the polyamide chain of atoms, said layer containing light-sensitive silver salts.

4. A color-yielding photographic element comprising a support bearing at least one layer composed of a hydrophilic diaminodipropyl ether/adipic acid polyamide which has attached to recurring amido nitrogen atoms approximately one hydroxybenzyl ether group for each six amide groups, said layer having light-sensitive silver halides dispersed therethrough.

5. A color-yielding photographic element comprising a support bearing at least one layer composed of a hydrophilic mixed butyloxymethylphenylpyrazolonoxymethyl polyamide which has attached to recurring amido nitrogen atoms approximately one phenylmethylpyrazolonoxymethyl group for each eight amide groups, said layer having light-sensitive silver halides dispersed therethrough.

6. A color-yielding photographic element comprising a support bearing at least one layer composed of a hydrophilic polyamide containing recurring structural units of the formula

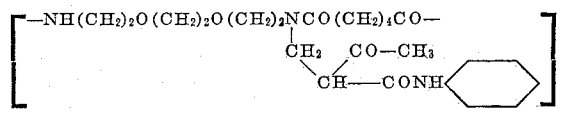

said layer having light-sensitive silver halides dispersed therethrough.

DAVID M. McQUEEN.

REFERENCES CITED

The following references are of record in the file of this patent:

UNITED STATES PATENTS

| Number | Name | Date |
| --- | --- | --- |
| 2,186,849 | Wilmanns | Jan. 9, 1940 |
| 2,186,733 | Schneider et al. | Jan. 9, 1940 |
| 2,297,732 | Woodward | Oct. 6, 1942 |
| 2,306,410 | Schinzel | Dec. 29, 1942 |
| 2,320,422 | Frohlich | June 1, 1943 |
| 2,282,001 | Russell et al. | May 5, 1942 |
| 2,292,575 | Loleit | Aug. 11, 1942 |
| 2,310,943 | Dorough et al. | Feb. 16, 1943 |
| 2,330,291 | Kirby | Sept. 28, 1943 |
| 2,299,839 | McQueen | Oct. 27, 1942 |
| 2,307,399 | Frohlich et al. | Jan. 5, 1943 |
| 2,365,416 | Kuhne | Dec. 19, 1944 |

FOREIGN PATENTS

| Number | Country | Date |
| --- | --- | --- |
| 537,256 | Great Britain | June 16, 1941 |